United States Patent
Kim et al.

(10) Patent No.: US 12,184,205 B2
(45) Date of Patent: Dec. 31, 2024

(54) SYSTEM FOR ESTIMATING ROTOR RESISTANCE OF AN INDUCTION MOTOR

(71) Applicants: HYUNDAI MOTOR COMPANY, Seoul (KR); KIA CORPORATION, Seoul (KR)

(72) Inventors: Tae Kil Kim, Suwon-si (KR); Jung Hwi Kim, Seoul (KR); Jae Hak Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 184 days.

(21) Appl. No.: 18/085,138

(22) Filed: Dec. 20, 2022

(65) Prior Publication Data

US 2024/0014755 A1 Jan. 11, 2024

(30) Foreign Application Priority Data

Jul. 6, 2022 (KR) .......................... 10-2022-0082890

(51) Int. Cl.
*H02P 21/16* (2016.01)
*H02P 21/20* (2016.01)

(52) U.S. Cl.
CPC .............. *H02P 21/16* (2016.02); *H02P 21/20* (2016.02)

(58) Field of Classification Search
CPC ...... H02P 21/16; H02P 21/20; H02P 2207/01; H02P 23/14; H02P 21/14
USPC ................................ 318/400.02, 400.01, 700
See application file for complete search history.

(56) References Cited

U.S. PATENT DOCUMENTS 6,316,904 B1 * 11/2001 Semenov ................ H02P 21/16
318/727

FOREIGN PATENT DOCUMENTS

| KR | 20020083613 A | 11/2002 |
| KR | 20090067919 A | 6/2009 |
| KR | 101229781 B1 | 2/2013 |
| KR | 101551676 B1 | 9/2015 |

* cited by examiner

*Primary Examiner* — David Luo
(74) *Attorney, Agent, or Firm* — Lempia Summerfield Katz LLC

(57) ABSTRACT

A system for estimating a rotor resistance of an induction motor includes: an equivalent torque curve generation unit to generate an equivalent torque curve based on output torques of the induction motor; a minimum current operation point determination unit to determine a minimum current operation point of the equivalent torque curve; an equivalent current phase variable control unit to variably control a rotor resistance of the induction motor when a stator current command of the minimum current operation point is applied to the induction motor; an output torque detection unit to detect the output torque of the induction motor when the rotor resistance is variably controlled; and a rotor resistance determination unit to determine a maximum torque among the detected output torques and determine an actual rotor resistance of the induction motor based on the rotor resistance when the maximum torque is generated.

7 Claims, 4 Drawing Sheets

SYSTEM FOR ESTIMATING ROTOR RESISTANCE OF AN INDUCTION MOTOR

CROSS-REFERENCE TO RELATED APPLICATION

This application claims under 35 U.S.C. § 119(a) the benefit of and priority to Korean Patent Application No. 10-2022-0082890, filed on Jul. 6, 2022, the entire contents of which are incorporated herein by reference.

BACKGROUND

(a) Field

The present disclosure relates to a system for estimating a rotor resistance of an induction motor, and more specifically, to a system with increased estimation accuracy for a rotor resistance of an induction motor.

(b) Background Art

In general, induction motors have advantages of being cheaper and more reliable than a permanent magnet motor, and the induction motors have a small drag loss during no-load operation. The induction motors are also used as motors for vehicles due to the above advantages.

In addition, although it is not easy to control the induction motor compared to the permanent magnet motor, an instantaneous torque control is sometimes applied through a vector control to improve performance thereof.

In order to perform the vector control of the induction motor, a magnitude of a magnetic flux is adjusted by a current of a d-axis component and a magnitude of a torque is independently controlled by a current of a q-axis component by setting a position of a magnetic flux vector to a d-axis and separating a current of a three-phase stator into the d-axis component and the q-axis component on a synchronous coordinate system.

In the induction motor, a rotor inter-linkage magnetic flux is mainly used as a reference magnetic flux set to the d-axis. The vector control of the induction motor in which the rotor inter-linkage magnetic flux is set to the reference magnetic flux is referred to as a rotor flux oriented control (RFO).

Unlike DC motors in which a position of the magnetic flux is fixed or permanent magnet synchronous motors (IPM) in which a magnetic flux of a rotor matches a position of the permanent magnet, the induction motor has a relative speed difference between the rotor magnetic flux vector and the rotor. Thus, it is difficult to accurately identify a position of the magnetic flux vector.

In order to obtain the position of the magnetic flux vector, there are a direct vector control method and an indirect vector control method. The direct vector control method obtains a magnetic flux angle by calculating the rotor inter-linkage magnetic flux based on a voltage and a current. The indirect vector control method obtains a slip angular velocity for dividing a stator current into a d-axis current command and a q-axis current command and performs a control with a magnetic flux angle obtained by adding the slip angular velocity and an angular velocity of the rotor. Among them, the indirect vector control method is preferred because it is easily implemented and has a small error even at a low speed.

However, in order to accurately calculate the position of the rotor inter-linkage magnetic flux or the slip angular velocity in the direct vector control method and the indirect vector control method, accurate information on parameters such as a rotor leakage inductance, magnetization inductance, and rotor resistance of the induction motor are required.

In order to estimate the parameters of the induction motor, a blocked rotor test and a no-load test are generally conducted. However, when a current command is generated based on the parameters and torque calculation equation extracted through the two tests and the vector control of the induction motor is performed with the generated current command, an error in an output torque occurs at a nonnegligible level.

Meanwhile, a conventional method of estimating the rotor resistance of the induction motor may be classified into a method of estimating the rotor resistance in an offline method and a method of estimating the rotor resistance in an online method.

A representative method of the offline method is a method of estimating the rotor resistance through the blocked rotor test. When the rotor resistance is estimated through the blocked rotor test, it is assumed that the stator current flows only in the rotor because a rotor circuit impedance is small when a slip is 1, and then the rotor resistance is obtained by calculating loss power as a loss by the resistance components of the stator and the rotor.

A representative method of the online method obtains the rotor resistance by obtaining a magnetic flux with each of a voltage model and a current model and by comparing the magnetic fluxes to correct the rotor resistance using a magnetic flux estimator. A function of the rotor resistance is not applied to the voltage model, and a function of the rotor resistance is applied to the current model.

The blocked rotor test has the advantage of being able to obtain the rotor resistance without predetermined signal processing and complicated calculation, but a nonnegligible error occurs in the rotor resistance because the rotor resistance is calculated on the assumption that all of the stator currents flow to the rotor.

The on-line method has a problem in that logic implementation is complicated and an area in which a magnetic flux estimation error is large is present.

The above information disclosed in this Background section is provided only to enhance understanding of the background of the disclosure. Thus, it may include information that does not form the prior art that is already known to a person of ordinary skill in the art.

SUMMARY

The present disclosure has been made in efforts in consideration of the above problems, and an object of the present disclosure is to provide a system for estimating a rotor resistance of an induction motor, which may accurately estimate the rotor resistance among parameters of the induction motor.

The object of the present disclosure is not limited to the above-described object, and other objects of the present disclosure not mentioned should be able to be clearly understood to those having ordinary skill in the art to which the present disclosure pertains from the following description.

In one embodiment of the present disclosure, a system for estimating a rotor resistance of an induction motor includes: an equivalent torque curve generation unit configured to generate an equivalent torque curve based on output torques of the induction motor determined according to a stator current command; a minimum current operation point determination unit configured to determine a minimum current operation point of the equivalent torque curve; and an equivalent current phase variable control unit configured to variably control a rotor resistance of the induction motor in a state in which the stator current command of the minimum current operation point is applied to the induction motor. The system further includes: an output torque detection unit configured to detect the output torque of the induction motor when the equivalent current phase variable control unit variably controls the rotor resistance; and a rotor resistance determination unit configured to determine a maximum torque among the output torques detected by the output torque detection unit. The rotor resistance determination unit is configured to determine the rotor resistance when the maximum torque is generated as an actual rotor resistance of the induction motor.

According to an embodiment of the present disclosure, the equivalent current phase variable control unit transmits information on the changed rotor resistance to the rotor resistance determination unit each time the equivalent current phase variable control unit variably controls the rotor resistance of the induction motor.

In addition, according to the embodiment of the present disclosure, the output torque detection unit detects the output torque of the induction motor and transmits information on the detected output torque to the rotor resistance determination unit each time the equivalent current phase variable control unit transmits the information on the rotor resistance to the rotor resistance determination unit.

In addition, the rotor resistance determination unit matches and stores the rotor resistance received from the equivalent current phase variable control unit and the output torque received from the output torque detection unit, and the rotor resistance determination unit compares the stored output torques to determine a rotor resistance, which is matched with the maximum torque among the output torques, as an actual rotor resistance of the induction motor.

In addition, according to the embodiment of the present disclosure, the equivalent torque curve is a curve generated by a combination of the stator current commands that generate output torques having the same magnitude. In addition, the minimum current operation point is an operation point at which a maximum torque per ampere applied to the induction motor is generated.

In addition, the output torque detection unit calculates the output torque of the induction motor based on an angular acceleration of a rotor shaft provided in the induction motor.

According to the present disclosure according to the above configuration, it is possible to more accurately estimate the rotor resistance of the induction motor, and correct the manufacturing deviation of the induction motor by accurately estimating the initial rotor resistance value when the system for estimating the rotor resistance of the induction motor is applied to the motor control unit for a vehicle.

The effect of the present disclosure is not limited to the above-described effect, and other effects of the present disclosure not mentioned should be able to be clearly understood by those having ordinary skill in the art to which the present disclosure pertains from the following description.

It is understood that the term "automotive" or "vehicular" or other similar term as used herein is inclusive of motor automobiles in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed below.

BRIEF DESCRIPTION OF THE DRAWINGS

The above and other features of the present disclosure are now described in detail with reference to certain embodiments thereof illustrated in the accompanying drawings which are given herein below by way of illustration only, and thus are not limitative of the present disclosure, and wherein.

Figure 1:
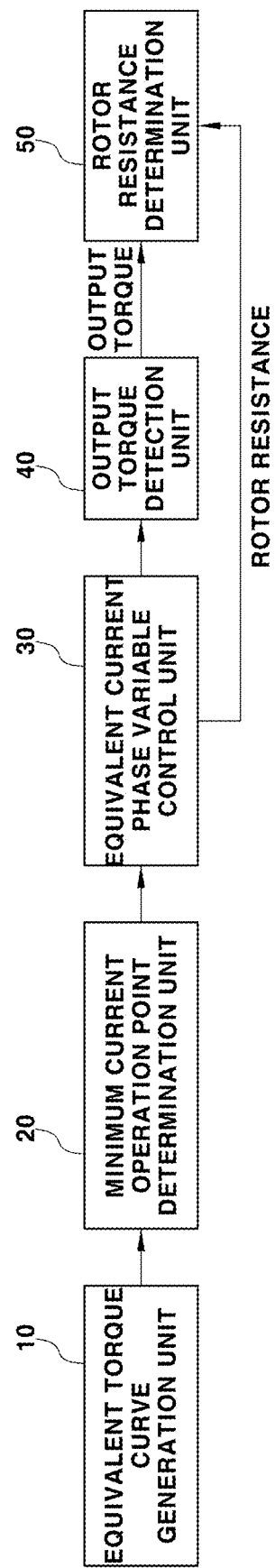
FIG. 1 is a configuration diagram showing a system for estimating a rotor resistance of an induction motor according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes should be determined in section by the particular intended application and use environment.

In the figures, reference numbers refer to the same or equivalent sections of the present disclosure throughout the several figures of the drawing.

DETAILED DESCRIPTION

In this specification, when a certain portion "comprises" a certain component, it means that other components may be further included rather than excluding other components unless otherwise stated. When a component, device, element, or the like of the present disclosure is described as having a purpose or performing an operation, function, or the like, the component, device, or element should be considered herein as being "configured to" meet that purpose or to perform that operation or function.

In addition, terms such as " . . . part" and " . . . unit" described in this specification mean a unit that processes at least one function or operation, which may be configured as a software module operated by a set program, configured as a hardware module composed of electronic devices (e.g., a processor), or configured as a combination module in which the software module and the hardware module are combined.

In addition, in this specification, terms such as "first" and/or "second" may be used to describe various components, but the components are not limited to the terms. The terms are used only for the purpose of distinguishing one component from other components. For example, a first component may be named as a second component, and similarly, the second component may be named as the first component without departing from the scope according to the concept of the present disclosure.

Hereinafter, embodiments of the present disclosure are described with reference to the accompanying drawings. The matters expressed in the accompanying drawings may be different from forms actually implemented in the drawings shown to easily describe the embodiments of the present disclosure.

The present disclosure provides a system for accurately estimating a rotor resistance among motor parameters required to perform an accurate vector control of an induction motor.

Figure 2:
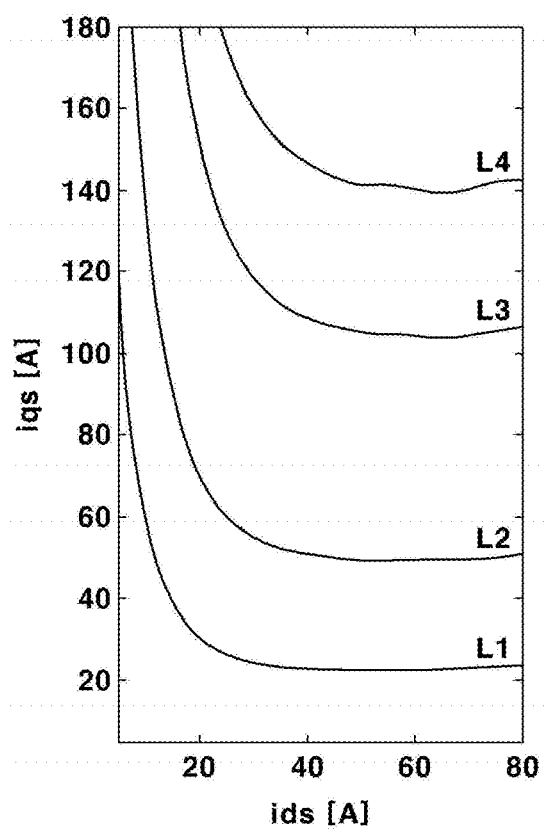
FIG. 2 is a view illustrating an equivalent torque curve according to the embodiment of the present disclosure.
Figure 3:
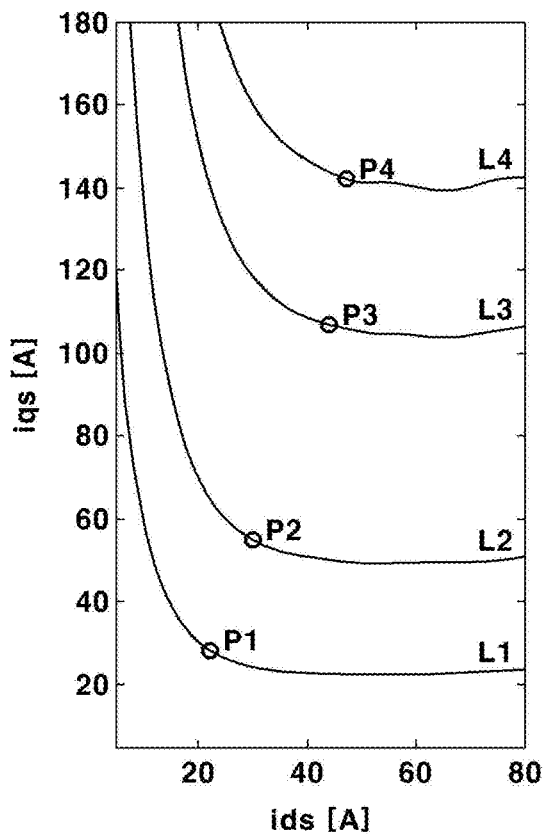
FIG. 3 is a view showing a minimum current operation point of the equivalent torque curve shown in FIG. 2.
Figure 4:
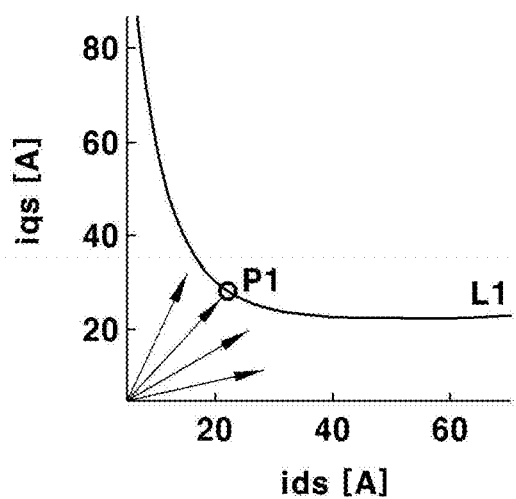
FIG. 4 is a view showing a change in a phase of a stator current generated by an equivalent current phase variable control according to the embodiment of the present disclosure.
Figure 5:
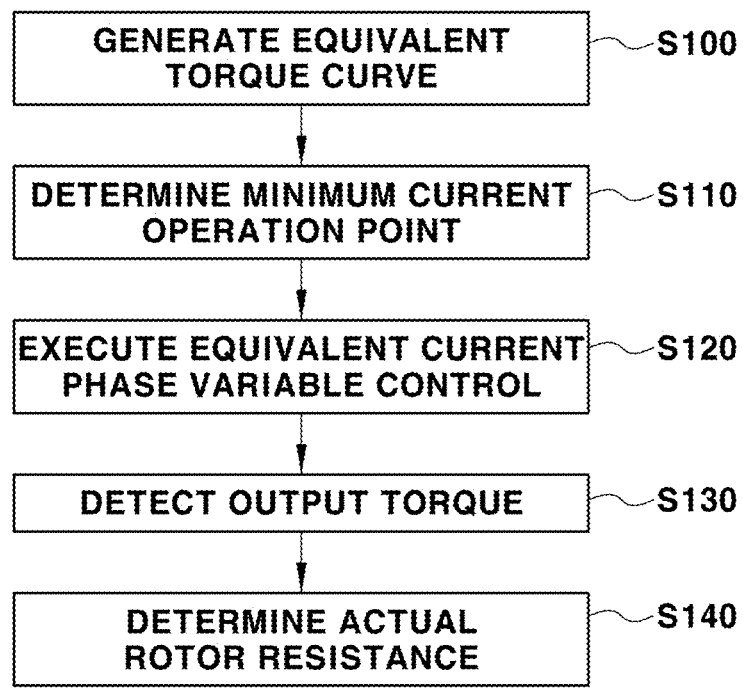
FIG. 5 is a flowchart schematically illustrating a method of estimating the rotor resistance of the induction motor according to an embodiment of the present disclosure.

FIG. 1 is a configuration diagram showing a system for estimating a rotor resistance of an induction motor according to an embodiment of the present disclosure, FIG. 2 is a view showing an equivalent torque curve according to the embodiment of the present disclosure, FIG. 3 is a view showing a minimum current operation point of the equivalent torque curve shown in FIG. 2, FIG. 4 is a view showing a change in a phase of a stator current generated by an equivalent current phase variable control according to the embodiment of the present disclosure, and FIG. 5 is a flowchart schematically illustrating a method of estimating the rotor resistance of the induction motor according to the embodiment of the present disclosure.

As shown in FIG. 1, the system for estimating the rotor resistance of the induction motor includes: an equivalent torque curve generation unit 10, a minimum current operation point determination unit 20, an equivalent current phase variable control unit 30, an output torque detection unit 40, and a rotor resistance determination unit 50.

The equivalent torque curve generation unit 10 is configured to generate equivalent torque curves of the induction motor based on output torque values of the induction motor determined according to a stator current command.

The equivalent torque curve generation unit 10 includes a torque determination map of the induction motor and calculates the output torque value of the induction motor through the torque determination map. The torque determination map is configured to calculate an output torque of the induction motor determined according to the stator current command. The torque determination map is configured to calculate an output torque $T_e$ of the induction motor according to a torque equation shown in Equation 1 below.

$$T_e = \frac{P}{2}\frac{3}{2}\frac{L_m^2}{L_r}i_{ds}i_{qs} \qquad \text{Equation 1}$$

In Equation 1, $T_e$ refers to the output torque of the induction motor, P refers to the number of poles of the induction motor, $L_m$ refers to a magnetization inductance of the induction motor, $L_r$ refers to a rotor inductance, $i_{ds}$ refers to a d-axis current command, and $i_{qs}$ refers to a q-axis current command. In addition, the rotor inductance $L_r$ refers to a value obtained by adding a rotor leakage inductance $L_{lr}$ and the magnetization inductance $L_m$.

As shown in Equation 1, the torque determination map is configured to calculate the output torque $T_e$ of the induction motor based on the rotor leakage inductance Llr, the magnetization inductance $L_m$, and the current commands $i_{ds}$ and $i_{qs}$.

Here, as the rotor leakage inductance $L_{lr}$ and the magnetization inductance $L_m$, values determined in advance through a test may be used. Specifically, as the rotor leakage inductance $L_{lr}$, a value measured through a blocked rotor test may be used, and a value measured through a no-load test may be used as the magnetization inductance $L_m$.

In addition, since the rotor leakage inductance $L_{lr}$ and the magnetization inductance $L_m$ are changed according to the stator current, the rotor leakage inductance $L_{lr}$ and the magnetization inductance $L_m$ may be determined through an inductance determination map configured to determine the rotor leakage inductance $L_{lr}$ and the magnetization inductance $L_m$. The inductance determination map may be constructed through previously executed tests and test results.

The equivalent torque curve generation unit 10 generates an equivalent torque curve based on output torques having the same magnitude value among the output torque values calculated through the torque determination map. The equivalent torque curve is a curve configured by combining the stator current commands $i_{ds}$ and $i_{qs}$ that generate the output torque having the same magnitude. In other words, the equivalent torque curve is generated through a combination of the output torque values having the same magnitude value among all of the output torque values calculated through the torque determination map. For example, the equivalent torque curve may be generated like curves L1, L2, L3, and L4 shown in FIG. 2. The equivalent torque curve generation unit 10 may generate from a relatively low torque curve to a relatively high torque curve.

The minimum current operation point determination unit 20 is configured to determine a minimum current operation point of the equivalent torque curve generated through the equivalent torque curve generation unit 10. As shown in FIG. 3, the minimum current operation point determination unit 20 selectively determines minimum current operation points P1, P2, P3, and P4 of each of the equivalent torque curves L1, L2, L3, and L4 generated through the equivalent torque curve generation unit 10.

FIG. 3 shows the respective minimum current operation points P1, P2, P3, and P4 of the equivalent torque curves L1, L2, L3, and L4 shown in FIG. 2, and FIG. 2 shows, for example, the equivalent torque curve L1 at 15 Nm, the equivalent torque curve L2 at 30 Nm, the equivalent torque curve L3 at 75 Nm, and the equivalent torque curve L4 at 100 Nm.

The minimum current operation point is expressed by a combination of the d-axis current command $i_{ds}$ that is a d-axis component current of the stator current and the q-axis current command $i_{qs}$ that is a q-axis component current. The stator current commands $i_{ds}$ and $i_{qs}$ of the minimum current operation points P1, P2, P3, and P4 shown in FIG. 3 are as shown in Table 1 below.

TABLE 1

| Minimum current operation point | Stator current command | |
|---|---|---|
| | $i_{ds}$ | $i_{qs}$ |
| P1 | 22 | 28 |
| P2 | 30 | 55 |
| P3 | 44 | 107 |
| P4 | 47 | 141 |

The minimum current operation points P1, P2, P3, and P4 mean a maximum torque per ampere (MTPA) operation point of the equivalent torque curve.

When an error occurs in the rotor resistance upon indirect vector control of the induction motor, the magnitude of the stator current is the same as the magnitude of the current at the operation point indicated by the stator current command $i_{ds}$ and $i_{qs}$, but since the d-axis component current and the q-axis component current are divided differently from the stator current commands $i_{ds}$ and $i_{qs}$, the induction motor is operated at an operation point different from the operation point (e.g., the minimum current operation point) determined by the stator current command (see FIG. 4).

In addition, when the stator current is controlled by the current commands $i_{ds}$ and $i_{qs}$ corresponding to the minimum current operation point of the equivalent torque curve, the maximum torque per ampere (MTPA) corresponding to the minimum current operation point may be predicted to be generated in the induction motor.

Accordingly, when only the rotor resistance is variably controlled in a state in which the stator current of the minimum current operation point is applied to the induction motor, it may be determined that the rotor resistance that generates the maximum torque per ampere (MTPA) of the induction motor is an actual rotor resistance of the induction motor.

In addition, a slip angular velocity of the induction motor may be determined according to the operation point, and the operation point of the induction motor is determined according to the stator current commands $i_{ds}$ and $i_{qs}$. When the stator current command of the minimum current operation point is applied to the induction motor, a slip angular velocity $\omega_{sl}$ of the induction motor may be calculated as shown in Equation 2 below.

$$\omega_{sl} = \frac{R_r}{L_r}\left(\frac{i_{qs}}{i_{ds}}\right) \quad \text{Equation 2}$$

In Equation 2, the rotor inductance $L_r$ refers to a value obtained by adding the rotor leakage inductance $L_{ls}$ and the magnetization inductance $L_m$, and may be changed according to the magnitude of the stator current.

As shown in Equation 2 above, the slip angular velocity $\omega_{sl}$ of the induction motor varies according to the d-axis current command $i_{ds}$ and the q-axis current command $i_{qs}$, and the slip angular velocity $\omega_{sl}$ is proportional to a rotor resistance $R_r$. An actual rotor resistance of the induction motor is set to a predetermined value.

Accordingly, when the rotor resistance $R_r$ is variably controlled in a state in which the stator current command at the minimum current operation point is applied to the induction motor, the slip angular velocity $\omega_{sl}$ may be variably controlled, and the d-axis current command $i_{ds}$ and the q-axis current command $i_{qs}$ may be variably controlled.

In other words, when only the rotor resistance $R_r$ is variably controlled in a state in which the same stator current commands $i_{ds}$ and $i_{qs}$ are applied to the induction motor, a phase of the stator current may be variably controlled (see FIG. 4).

A length of the arrow shown in FIG. 4 indicates the magnitude of the stator current, and a slope of the arrow indicates the phase of the stator current. As shown in FIG. 4, when the phase of the stator current is changed, the operation point of the stator indicated by the arrow is changed.

The minimum current operation point determined by the minimum current operation point determination unit 20 is an operation point at which the maximum torque per ampere (MTPA) applied to the induction motor occurs. Accordingly, the actual rotor resistance value is estimated based on a rotor resistance value obtained when the maximum output torque (i.e., the maximum torque) occurs among the output torque values of the induction motor which are generated when the equivalent current phase variable control is executed at the minimum current operation point of the equivalent torque curve.

Here, a control of changing the phase of the stator current in a state in which the magnitude value of the stator current is determined and fixed to a predetermined value is referred to as an 'equivalent current phase variable control'.

In other words, the variable control of the rotor resistance of the induction motor in the state in which the stator current command determined according to the minimum current operation point is applied to the induction motor is referred to as the 'equivalent current phase variable control'. As a result of executing the equivalent current phase variable control, the rotor resistance when the maximum output torque is generated becomes the actual rotor resistance value of the induction motor.

The equivalent current phase variable control unit 30 executes the equivalent current phase variable control in order to implement the effect of variably controlling the phase of the stator current step by step. In other words, the equivalent current phase variable control unit 30 variably controls the rotor resistance of the induction motor while maintaining the state in which the stator current command at the minimum current operation point is applied to the induction motor.

For example, the equivalent current phase variable control unit 30 may execute the equivalent current phase variable control in a manner in which the rotor resistance value is increased or decreased at regular intervals.

In addition, the equivalent current phase variable control unit 30 transmits information on the changed rotor resistance (i.e., the magnitude value of the rotor resistance) to the rotor resistance determination unit 50 each time the magnitude of the rotor resistance is variably controlled while executing the equivalent current phase variable control.

In addition, the equivalent current phase variable control unit 30 calculates the slip angular velocity based on the stator current and the rotor resistance when executing the equivalent current phase variable control. The equivalent current phase variable control unit 30 controls the induction motor based on the calculated slip angular velocity. The equivalent current phase variable control unit 30 may calculate a slip angular velocity value using Equation 2 above. The equivalent current phase variable control unit 30 transmits, to the rotor resistance determination unit 50, the rotor resistance value applied when calculating the slip angular velocity value.

The output torque of the induction motor is changed as the equivalent current phase variable control unit 30 variably controls the magnitude of the rotor resistance. The equivalent current phase variable control unit 30 requests the output torque detection unit 40 to detect the output torque of the induction motor each time the rotor resistance is changed. In another embodiment, the equivalent current phase variable control unit 30 may be configured to variably control the magnitude of the rotor resistance periodically. In this case, the output torque detection unit 40 is also configured to periodically detect the output torque of the induction motor.

The output torque detection unit 40 detects the output torque value of the induction motor when the equivalent current phase variable control unit 30 executes the equivalent current phase variable control. In other words, the output torque detection unit 40 detects the output torque value of the induction motor while the equivalent current phase variable control unit 30 variably controls only the rotor resistance while maintaining the stator current at a predetermined value.

The output torque detection unit 40 transmits the detected output torque value to the rotor resistance determination unit 50. The output torque detection unit 40 transmits the detected output torque value to the rotor resistance determination unit 50 each time the output torque value of the induction motor is detected. In other words, the output torque detection unit 40 detects the output torque of the induction motor each time the equivalent current phase variable control unit 30 transmits the information on the rotor resistance (i.e., the magnitude value of the rotor resistance) to the rotor resistance determination unit 50, and the output torque detection unit 40 transmits information on the detected output torque (i.e., the magnitude value of the output torque) to the rotor resistance determination unit 50.

The rotor resistance determination unit 50 matches and temporarily stores the rotor resistance value transmitted from the equivalent current phase variable control unit 30 and the output torque value transmitted from the output torque detection unit 40. The rotor resistance determination unit 50 may match the rotor resistance value and the output torque value based on a time point when the rotor resistance value and the output torque value are transmitted to the rotor resistance determination unit 50.

Specifically, the rotor resistance determination unit 50 receives the rotor resistance value from the equivalent current phase variable control unit 30 and then matches and stores the output torque value transmitted from the output torque detection unit 40 within a defined time.

For example, the rotor resistance determination unit 50 sequentially receives first rotor resistance information and second rotor resistance information from the equivalent current phase variable control unit 30, and sequentially receives first output torque information and second output torque information from the output torque detection unit 40. Then, the first output torque information is transmitted to the rotor resistance determination unit 50 between a transmission time point of the first rotor resistance information and a transmission time point of the second rotor resistance information. In addition, the second output torque information is transmitted to the rotor resistance determination unit 50 immediately after the transmission time point of the second rotor resistance information. In this case, the rotor resistance determination unit 50 may match and store the first rotor resistance information and the first output torque information, and match and store the second rotor resistance information and the second output torque information.

The rotor resistance determination unit 50 determines the output torque (i.e., the maximum torque) having the greatest magnitude value among the output torque values detected by the output torque detection unit 40, and determines the rotor resistance when the maximum torque is generated as the actual rotor resistance value of the induction motor. The rotor resistance determination unit 50 compares the output torque values transmitted from the output torque detection unit 40 and determines the maximum torque as the comparison result.

In other words, the rotor resistance determination unit 50 matches and temporarily stores the rotor resistance value and the output torque value based on a time point when the rotor resistance value and the output torque value are received. And, the rotor resistance determination unit 50 determines the rotor resistance value matched with the maximum torque, among the temporarily stored output torque values, as the actual rotor resistance value of the induction motor.

Meanwhile, according to the embodiment of the present disclosure, the equivalent current phase variable control unit 30 applies the stator current determined based on the minimum current operation point of any one of the equivalent torque curves L1, L2, L3, and L4 generated by the equivalent torque curve generation unit 10 to the induction motor. For example, the equivalent current phase variable control unit 30 may apply the stator current determined according to the minimum current operation point P1 of the first equivalent torque curve L1 in FIG. 3 to the induction motor.

The equivalent current phase variable control unit 30 variably controls the magnitude value of the rotor resistance under a condition in which the stator current of the minimum current operation point P1 is applied to the induction motor. Here, a change in the magnitude of the rotor resistance may mean a change in the phase of the stator current.

In addition, the output torque detection unit 40 detects the output torque of the induction motor that is changed according to the equivalent current phase variable control of the equivalent current phase variable control unit 30. The output torque detection unit 40 detects the output torque value of the induction motor each time a request from the equivalent current phase variable control unit 30 occurs, and transmits the detected output torque value to the rotor resistance determination unit 50. In other words, the output torque detection unit 40 detects the output torque value of the induction motor each time the rotor resistance value of the induction motor is changed, and the output torque detection unit 40 transmits the detected output torque value to the rotor resistance determination unit 50.

The output torque detection unit 40 directly measures the output torque when the output torque of the induction motor is directly measured. In one embodiment, the output torque detection unit 40 may include a torque measurement means for directly measuring the output torque of the induction motor, and the output torque detection unit 40 measures the output torque of the induction motor through the torque measurement means.

In addition, when the output torque of the induction motor may not be directly measured, the output torque detection unit 40 detects an angular velocity change amount (i.e., angular acceleration) of a rotor shaft through a rotor position sensor. The rotor shaft is a rotor shaft provided in the induction motor. The rotor position sensor is mounted on the induction motor, and an encoder or a resolver may be applied.

The angular acceleration of the rotor shaft is proportional to the output torque of the induction motor. Specifically, the output torque of the induction motor is proportional to a value obtained by differentiating the angular velocity of the rotor shaft. The output torque detection unit 40 may calculate the output torque of the induction motor based on the differential value of the angular velocity of the rotor shaft as shown in Equation 3 below.

$$T_e = J \frac{d^2\theta(t)}{dt^2} \quad \text{Equation 3}$$

In Equation 3, $T_e$ refers to the output torque of the induction motor, J refers to a rotor inertia moment of the induction motor, and θ(t) refers to an angular position (i.e., angular position) of the rotor shaft.

Meanwhile, according to another embodiment of the present disclosure, the equivalent current phase variable control unit 30 may perform the equivalent current phase variable control at two or more of the minimum current operation point P1, P2, P3, and P4 of the equivalent torque curves determined through the minimum current operation point determination unit 20.

For example, the equivalent current phase variable control unit 30 may transmit, to the rotor resistance determination unit 50, the rotor resistance values calculated when the equivalent current phase variable control is performed at the first minimum current operation point P1, and the equivalent current phase variable control unit 30 may transmit the rotor resistance values calculated when the equivalent current phase variable control is performed at the second minimum current operation point P2 to the rotor resistance determination unit 50.

Each time the equivalent current phase variable control unit 30 transmits the rotor resistance value to the rotor resistance determination unit 50, the output torque detection unit 40 detects the output torque of the induction motor and transmits the detected output torque to the rotor resistance determination unit 50.

The rotor resistance determination unit 50 determines a first rotor resistance value that generates the maximum torque at the first minimum current operation point P1, and determines a second rotor resistance value that generates the maximum torque at the second minimum current operation point P2. Next, the rotor resistance determination unit 50 determines an actual rotor resistance value by averaging the first rotor resistance value and the second rotor resistance value.

In other words, the rotor resistance determination unit 50 determines the rotor resistance values that generate the maximum torque at two or more minimum current operation points, and determines the actual rotor resistance value by averaging the determined rotor resistance values.

As described above, when the actual rotor resistance value is determined by averaging the rotor resistance values obtained from the plurality of minimum current operation points, it is possible to increase estimation accuracy of the actual rotor resistance value, and eventually increase the accuracy of the actual rotor resistance value compared to when the rotor resistance value obtained from one minimum current operation point is determined as the actual rotor resistance value.

In addition, the system for estimating the rotor resistance according to the present disclosure may also estimate the actual rotor resistance while gradually decreasing the change interval of the rotor resistance when variably controlling the rotor resistance through the equivalent current phase variable control.

Here, a method of estimating the rotor resistance of the induction motor according to an embodiment of the present disclosure is described with reference to FIG. 5. It should be noted that the description overlapping the above-described contents has been omitted.

As shown in FIG. 5, in order to estimate the rotor resistance of the induction motor, an equivalent torque curve of the induction motor is first generated by the equivalent torque curve generation unit 10 (S100). The equivalent torque curve generation unit 10 generates at least one equivalent torque curve based on the output torques of the induction motor determined according to the stator current command. The equivalent torque curve is a curve generated by combining the stator current commands that generate the output torques having the same magnitude.

Next, the minimum current operation point of the equivalent torque curve is determined by the minimum current operation point determination unit 20 (S110). The minimum current operation point is an operation point at which the maximum torque per ampere applied to the induction motor is generated.

Then, the equivalent current phase variable control is performed by the equivalent current phase variable control unit 30 (S120). In other words, the equivalent current phase variable control unit 30 variably controls the rotor resistance of the induction motor in the state in which the stator current determined according to the minimum current operation point is applied to the stator of the induction motor. The equivalent current phase variable control unit 30 transmits the changed rotor resistance value to the rotor resistance determination unit 50 in real time.

Subsequently, the output torque of the induction motor, which is changed by variably controlling the rotor resistance, is detected through the output torque detection unit 40 (S130). The output torque detection unit 40 detects the output torque value of the induction motor and transmits the detected output torque value to the rotor resistance determination unit 50 each time the equivalent current phase variable control unit 30 transmits the rotor resistance value to the rotor resistance determination unit 50.

Subsequently, the rotor resistance determination unit 50 compares the output torque values detected by the output torque detection unit 40, and determines the rotor resistance value when the maximum torque value is generated among the output torque values as the actual rotor resistance value of the induction motor (S140).

Although the embodiments of the present disclosure have been described above in detail, the terms or words used in this specification and claims should not be construed as being limited to general or dictionary meanings, and the scope of the present disclosure is not limited to the above-described embodiments either, and various modifications and improvements by those having ordinary skill in the art using the basic concept of the present disclosure should be included in the scope of the present disclosure.

What is claimed is:

1. A system for estimating a rotor resistance of an induction motor comprising:
   an equivalent torque curve generation unit configured to generate an equivalent torque curve based on output torques of the induction motor determined according to a stator current command;
   a minimum current operation point determination unit configured to determine a minimum current operation point of the equivalent torque curve;
   an equivalent current phase variable control unit configured to variably control a rotor resistance of the induction motor in a state in which the stator current command of the minimum current operation point is applied to the induction motor;
   an output torque detection unit configured to detect the output torque of the induction motor when the equivalent current phase variable control unit variably controls the rotor resistance; and
   a rotor resistance determination unit configured to:
   determine a maximum torque among the output torques detected by the output torque detection unit, and
   determine the rotor resistance when the maximum torque is generated as an actual rotor resistance of the induction motor.

2. The system of claim 1,
wherein the equivalent current phase variable control unit transmits information on the changed rotor resistance to the rotor resistance determination unit each time the equivalent current phase variable control unit variably controls the rotor resistance of the induction motor.

3. The system of claim 1,
wherein the output torque detection unit detects the output torque of the induction motor and transmits information on the detected output torque to the rotor resistance determination unit each time the equivalent current phase variable control unit transmits the information on the rotor resistance to the rotor resistance determination unit.

4. The system of claim 3,
wherein the rotor resistance determination unit is configured to:
match and store the rotor resistance received from the equivalent current phase variable control unit and the output torque received from the output torque detection unit, and
compare the stored output torques to determine a rotor resistance, matched with the maximum torque among the output torques, as an actual rotor resistance of the induction motor.

5. The system of claim 1,
wherein the equivalent torque curve is a curve generated by a combination of the stator current commands that generate output torques having the same magnitude.

6. The system of claim 1,
wherein the minimum current operation point is an operation point at which a maximum torque per ampere applied to the induction motor is generated.

7. The system of claim 1,
wherein the output torque detection unit calculates the output torque of the induction motor based on an angular acceleration of a rotor shaft provided in the induction motor.

* * * * *